United States Patent
Oliver et al.

(10) Patent No.: US 6,637,558 B2
(45) Date of Patent: Oct. 28, 2003

(54) MAGNETORHEOLOGICAL STEERING DAMPER

(75) Inventors: Michael L. Oliver, Xenia, OH (US); William C. Kruckemeyer, Beavercreek, OH (US); Eric L. Jensen, Dayton, OH (US); Ronald G. Smith, New Carlisle, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/035,642

(22) Filed: Nov. 7, 2001

(65) Prior Publication Data

US 2003/0085086 A1 May 8, 2003

(51) Int. Cl.[7] ............................. F16F 9/53; B62D 9/00
(52) U.S. Cl. ............................. 188/267.2; 188/267.1; 180/400; 280/90
(58) Field of Search .................... 188/267, 267.1, 188/267.2; 180/400, 422, 446; 280/89, 90, 778, 779

(56) References Cited

U.S. PATENT DOCUMENTS

| | | | |
|---|---|---|---|
| 4,352,304 A | | 10/1982 | Warner |
| 4,509,775 A | | 4/1985 | Arndt |
| 5,272,933 A | | 12/1993 | Collier et al. |
| 5,542,343 A | | 8/1996 | Martin |
| 5,816,372 A | * | 10/1998 | Carlson et al. .......... 188/267.2 |
| 5,842,536 A | | 12/1998 | Birsching |
| 5,842,538 A | | 12/1998 | Sangret |
| 5,956,836 A | | 9/1999 | Dupuie |
| 6,120,046 A | | 9/2000 | Daly |
| 6,318,522 B1 | * | 11/2001 | Johnston et al. .......... 188/267.2 |
| 6,339,419 B1 | * | 1/2002 | Jolly et al. ................. 345/156 |

OTHER PUBLICATIONS

Catalog entitled "Nyliner bearing designer's guide", (Trademark of Thomson Industries, Inc., ©1998 Thomson Industries, Inc., pp. 1–19).

* cited by examiner

Primary Examiner—Jack Lavinder
Assistant Examiner—Thomas Williams
(74) Attorney, Agent, or Firm—Scott A. McBain (57) ABSTRACT

A damper for dampening vibrations of a rotatable steering shaft of a motor vehicle comprises a rotor and means for rotating the rotor at a rate proportional to and greater than rotation of the steering shaft. Magnetorheological fluid is disposed at least partially around the rotor, and has a viscosity variable to vary a load on the rotor.

11 Claims, 7 Drawing Sheets

MAGNETORHEOLOGICAL STEERING DAMPER

CROSS REFERENCE TO RELATED APPLICATIONS

This application is related to U.S. patent applications Ser. No. 09/821,870, now U.S. Pat. No. 6,464,050, filed Mar. 30, 2001; Ser. No. 09/851,464, now U.S. Pat. No. 6,501,305, filed May 8, 2001; Ser. No. 09/865,938, now U.S. Pat. No. 6,508,480 filed May 25, 2001; and Ser. No. 09/968,060 filed Oct. 2, 2001. The disclosure of each of these applications is hereby incorporated by reference.

TECHNICAL FIELD OF THE INVENTION

This invention relates generally to power steering systems for motor vehicles, and more particularly to a magnetorheological steering damper.

BACKGROUND OF THE INVENTION

Rotary dampers have been installed in steering assemblies of motor vehicles to dampen the amount of vibration detected by the vehicle operator from such variables as vehicle speed, road bumps, wheel alignment, wheel chatter, and tread wear. Rotary dampers of this type reduce the amount of vibration transferred to the vehicle operator by resisting rotational velocity generated from a pinion associated with the steering assembly. The rotational velocity is resisted by torque generated by the rotary damper, thereby reducing vibration. The torque is derived from a clutch-like resistance generated by a fluid when a rotor disposed within the vibration damper assembly is operatively connected to the pinion and receives rotational velocity from the pinion.

SUMMARY OF THE INVENTION

The present invention is a damper for dampening vibrations of a rotatable steering shaft of a motor vehicle. The damper comprises a rotor, and means for rotating the rotor at a rate proportional to and greater than rotation of the steering shaft. Magnetorheological fluid is disposed at least partially around the rotor, and has a viscosity variable to vary a load on the rotor.

Accordingly, it is an object of the present invention to provide an improved damper for motor vehicle steering systems.

Another object of the present invention is to provide a damper of the type described above in which the means for rotating the rotor includes gears of different diameters.

Still another object of the present invention is to provide a damper of the type described above in which the means for rotating the rotor includes a planetary drive system.

Still another object of the present invention is to provide a damper of the type described above which minimizes gear lash.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
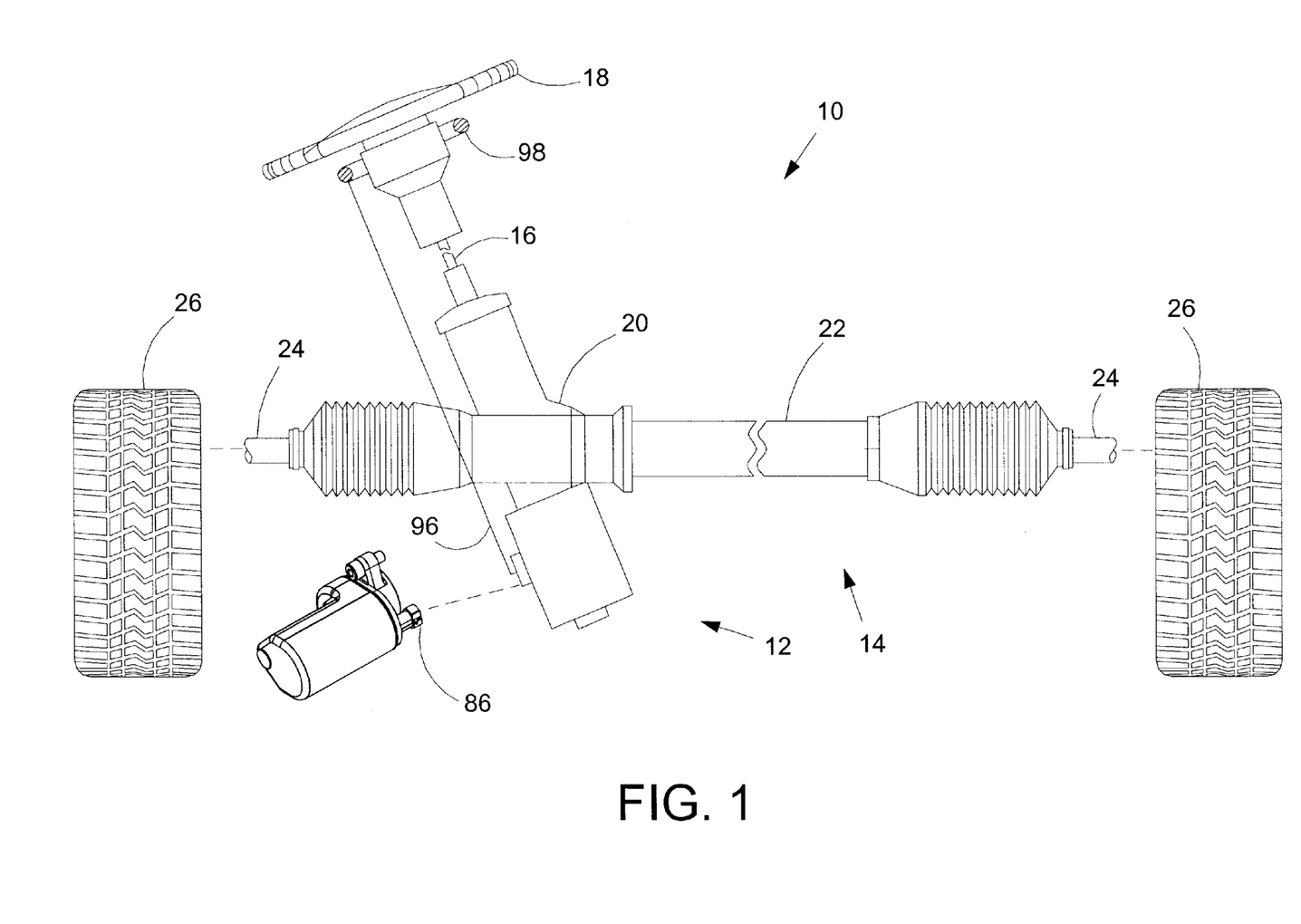
FIG. 1 is a schematic view of a steering system for a motor vehicle according to the present invention.

FIG. 1 shows one embodiment of a power steering system 10 according to the present invention for a motor vehicle. The steering system 10 includes a conventional rack-and-pinion type assembly 14 and an input shaft or steering column 16. The steering shaft 16 is coupled at one end to a steering wheel 18 of the vehicle, and near its opposite end is coupled to a gear box 20. A rack meshes with a pinion gear (not shown) on the steering shaft 16, and is slidable within a rack shaft and power cylinder portion 22 of the gear box 20 to left and right positions. As is well known, input by an operator of the motor vehicle through the steering wheel 18 causes left and right tie rods 24 to correspondingly turn wheels 26.

Figure 2:
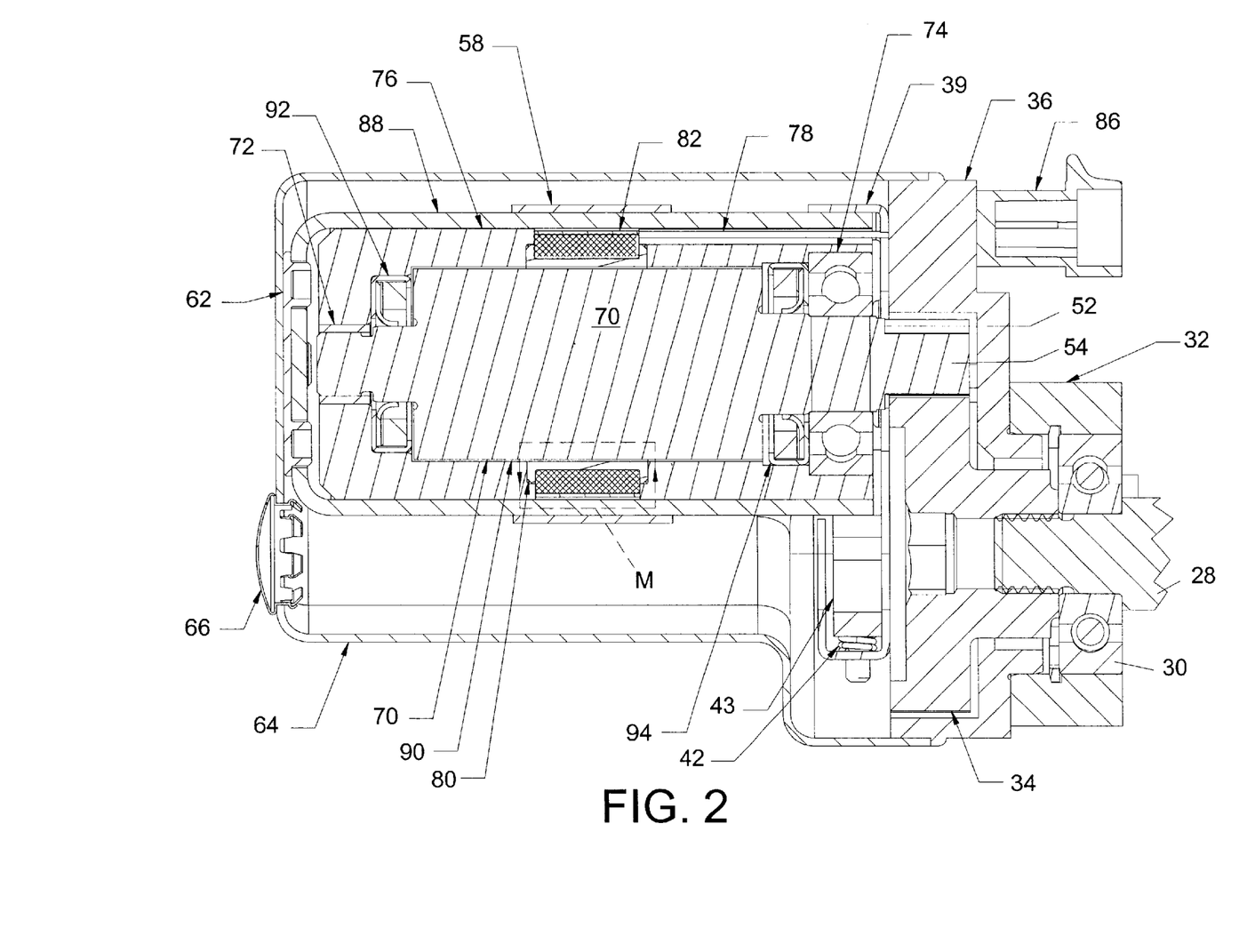
FIG. 2 is a cross sectional view of a steering damper of the steering system.
Figure 3:
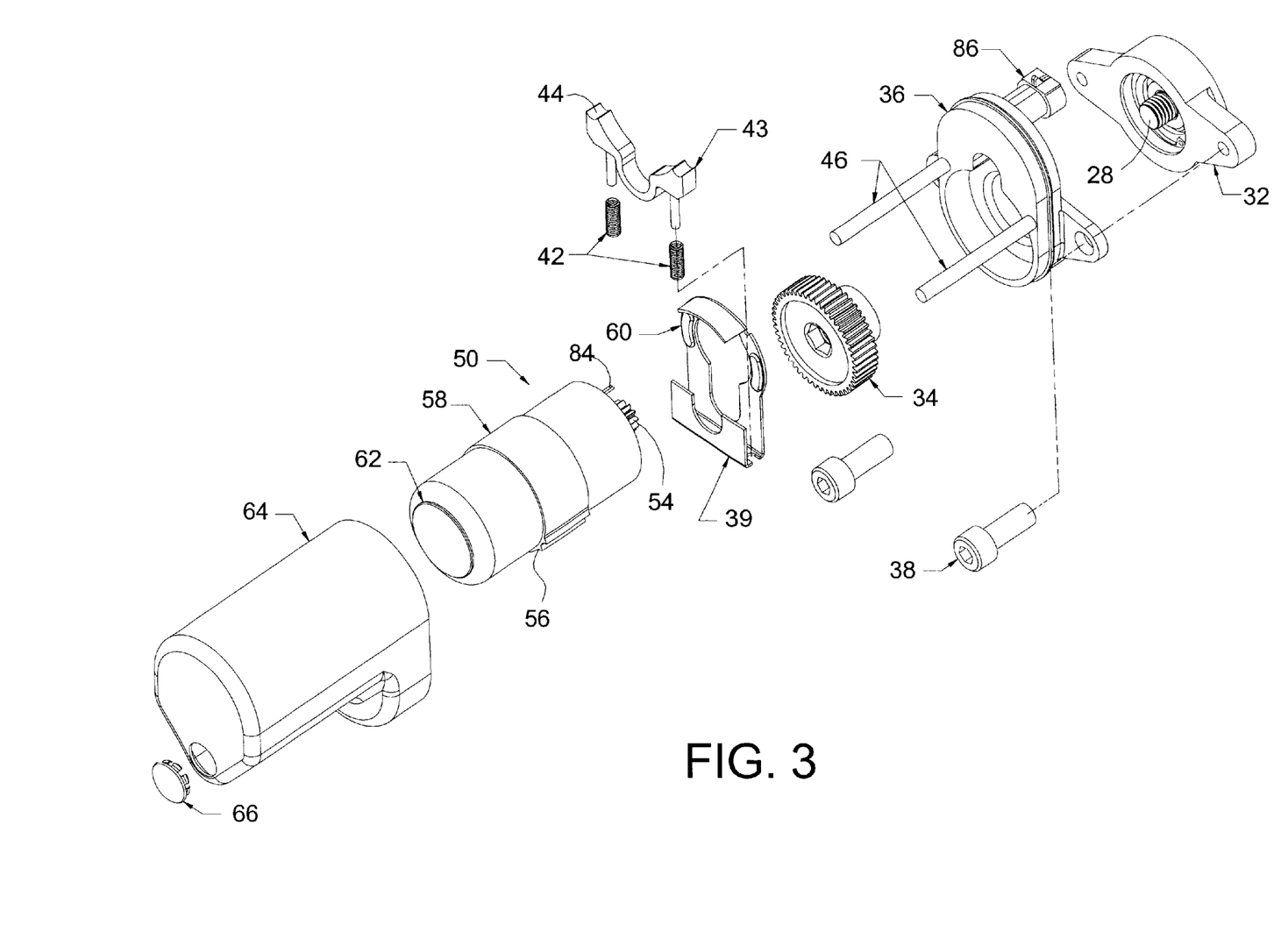
FIG. 3 is an exploded perspective view of the steering damper shown in FIG. 2.

A vibration damper 12 is coupled to a lower end of the steering shaft 16. As FIGS. 2 and 3 show, the distal end 28 of the steering shaft extends through bearings 30 mounted in a steering gear structure 32, and is threadingly engaged with a drive gear 34 such that the drive gear rotates with the steering shaft 16. A base 36 receives the drive gear 34, and with the steering gear structure 32 is attached to a steering gear housing on the lower end of the gear box 20 with screws 38. A gear loading bracket 39 is installed with springs 42 and a spring support 43 so that grooves 44 in the spring support rest against pins 46 projecting from the base 36.

A damper subassembly 50 includes a rotor shaft 52 that is closely received through an enlarged central hole in the gear loading bracket 39. The rotor shaft 52 has an integral gear 54 that is pressed into tight engagement with the drive gear 34 by the gear loading bracket 39. This loading also causes grooves 56 on an elastomeric band 58 installed on the damper subassembly to engage the pins 46 on the base 36. It should be appreciated that in place of grooves, the elastomeric band 58 may be provided with holes therethrough to receive the pins 46. Elastomeric pads 60 attached to the gear loading bracket 39 limit the downward movement of the damper subassembly. Upward travel of the damper subassembly 50 is optionally limited by an end cap 62 that is preferably formed of a bearing-type material such as nylon, TFE containing compounds, brass or bronze. A cover 64 encloses the assembly, and a cap 66 provides access to allow the drive gear 34 to be secured to the steering wheel shaft.

Figure 4:
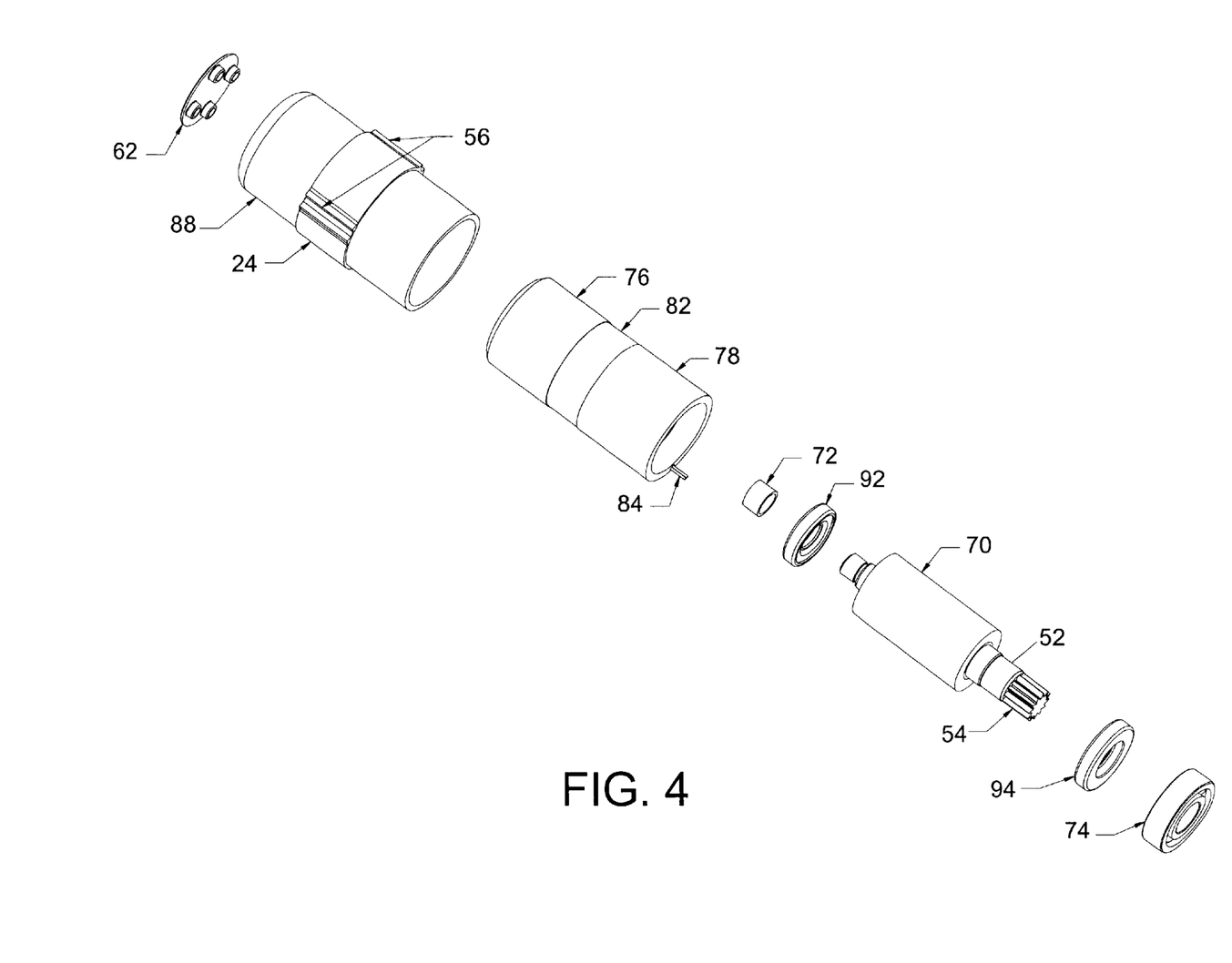
FIG. 4 is an exploded perspective view of a damper subassembly of the steering damper.

FIG. 4 shows the damper subassembly 50 in greater detail. The damper subassembly 50 includes a rotor 70 of magnetically soft iron rotatably mounted by bearings 72 and 74, with the gear 54 formed on one end. A magnet assembly includes two poles 76 and 78 of magnetically soft steel and a bobbin 80 of a magnetically resistive material like stainless steel, all of which are attached by brazing or welding. A coil 82 is wound on the bobbin 80, with leads 84 extending out of the subassembly and connectable to a connector 86 in the final assembly. A subassembly case 88 of magnetically soft iron encloses the damper subassembly 50.

An interior cavity 90 shown in FIG. 2 and defined by the rotor 70, the magnet assembly 76, 78 and 80, and the seals 92 and 94 is filled with magnetorheological (MR) fluid. The MR fluid, typically a mixture including very small iron particles suspended in oil, becomes less viscous when a magnetic field is applied to it. During normal vehicle operation, any rotary movement of the steering wheel shaft 16 rotates the attached drive gear 34 that, in turn, drives the rotor 70 at an increased rotational speed. Rotation of the rotor 70 is damped by the viscous drag of the MR fluid in the interior cavity 90. When no electrical current is supplied to the coil 82, the rotor 70 rotates with a relatively low level of damping. When electrical current is supplied to the coil 82, a magnetic field is set up through the rotor 70, the poles 76 and 78, and subassembly case 88 approximately as shown by M. This magnetic field causes the MR fluid in cavity 90 to thicken and increase the damping applied to rotation of the rotor 70. The thickening effect of the magnetic field on the MR fluid is proportional, with increasing field strength causing more thickening.

The damping supplied by the damper subassembly 50 is externally controlled. An input on a line 96 from a sensing device 98 operationally coupled to the steering wheel 18 is directed to the connector 86. The sensing device 98 may be any suitable device which indicates that the steering wheel 18 and/or the steering shaft 16 is being turned or rotated by the driver, and which generates and the input on line 96. The input from the steering wheel 18 is used by the magnetic circuit to generate a current within the coil 82, and thus to generate a magnetic flux within the rotor 70. The damping supplied by the steering damper is therefore continuously variable by external control of the current supplied by the coil. Typical external controls for the steering damper include a system to determine when the vehicle driver is applying force to turn the steering wheel, when it is desired to allow the steering system to return to the straight ahead position or when objectionable steering wheel vibration is occurring. This information is used to apply more steering damping at time of no steering activity to control vibrations and apply less steering damping during steering events to allow easier steering.

The ratio between the gears 54 and 34 causes the damping of the damper subassembly 50 to be multiplied before being applied to the steering gear shaft. This allows a smaller overall package size and requires less MR fluid that a steering damper without torque multiplication. Furthermore, looseness or lash in the gear engagement that might allow vibrations to pass through the steering damper undamped is reduced or eliminated by the moveable damper subassembly 50 and the spring system that presses the gears into tight engagement.

Figure 5:
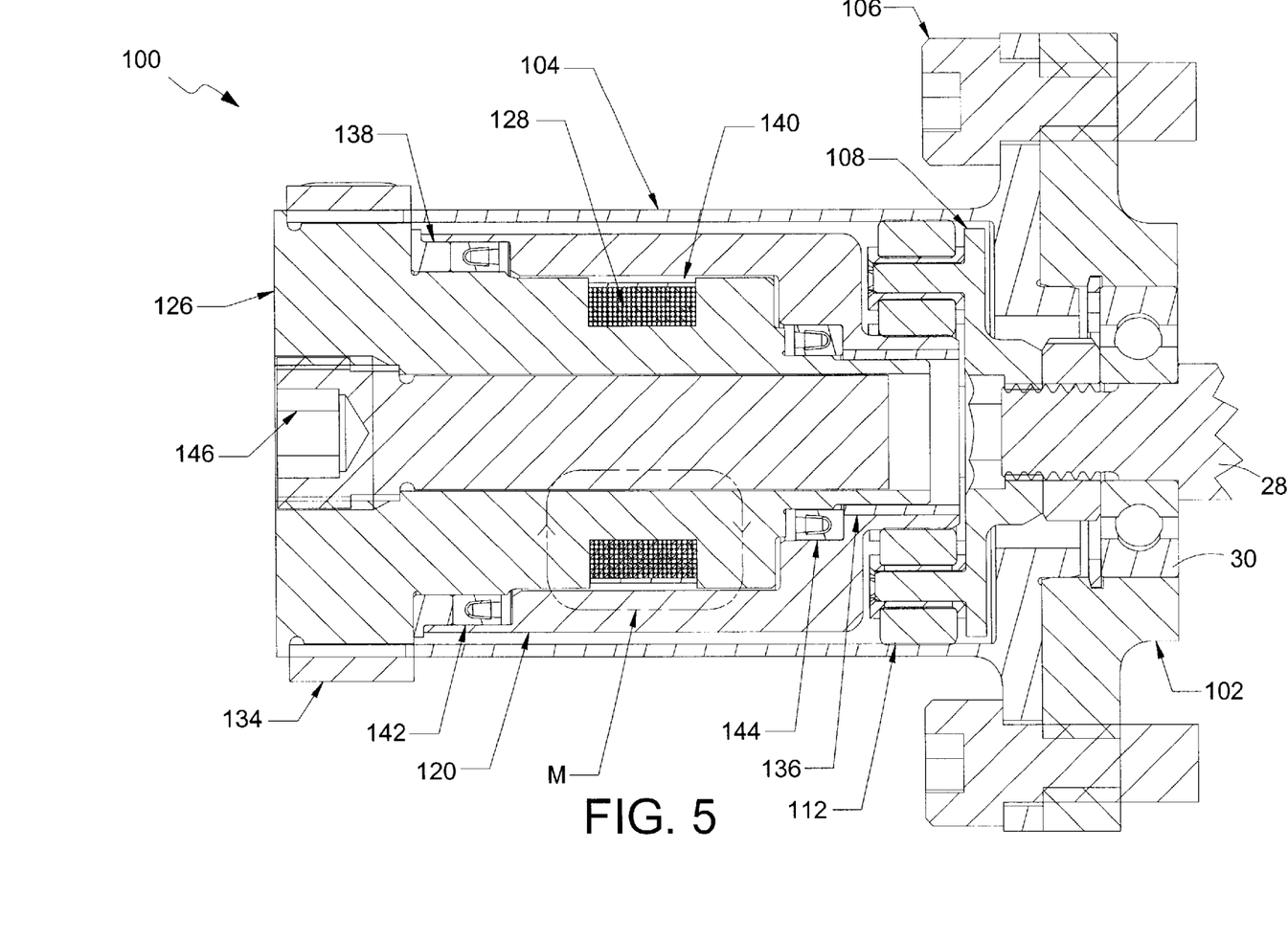
FIG. 5 is a cross sectional view of an alternative embodiment of the steering damper.
Figure 6:
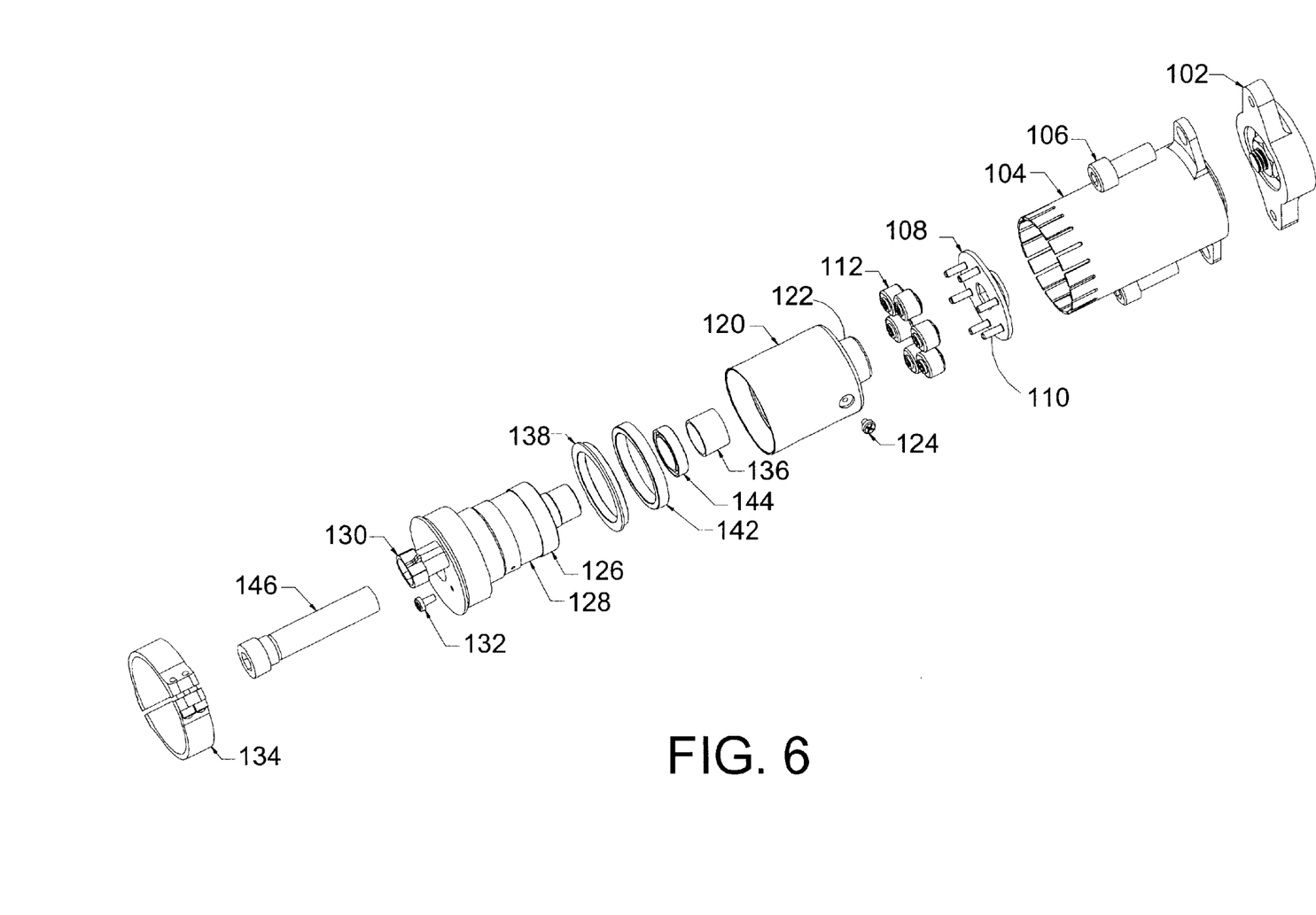
FIG. 6 is an exploded perspective view of the steering damper shown in FIG. 5.
Figure 7:
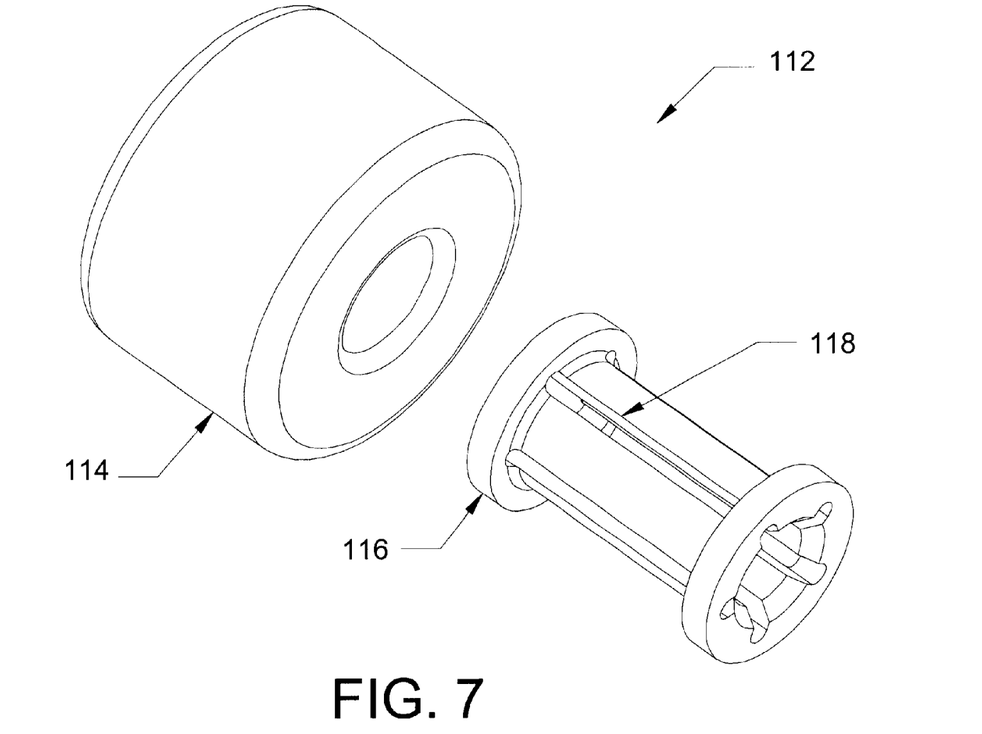
FIG. 7 is an exploded perspective view of a wheel assembly of the steering damper shown in FIGS. 5 and 6.

FIGS. 5 and 6 show an alternative embodiment 100 of the steering vibration damper including a mounting flange 102 disposed around the end of the steering wheel shaft 28 and ball bearings 30. A housing 104 is secured to the flange 102 by screws 106. A driver 108 has a center section including a thread for attachment to the steering wheel shaft and a socket (hex or other) for tightening the driver on the steering shaft at installation. The driver 108 also has a plurality of drive pins 110 which accept wheel assemblies 112. The wheel assemblies 112, shown in more detail in FIG. 7, each include an elastomeric wheel 114 installed on a flexible bearing 116. Each bearing 116 has straight or slanted slots 118 that allow it to be compressed by the wheel 114 against the pins 110 of the driver 108. Bearings similar in design to those described here are available from Thomson Industries of Port Washington, N.Y.

A rotor 120 is constructed of magnetically soft steel. A projection 122 at the end of the rotor 120 extends into the area occupied by the wheel assemblies 112. The wheel assemblies are held in contact with the interior of the housing 104 and the exterior of the projection 122 on the rotor by virtue of the sizing and location of the pins 110 on the driver 108, the wheels 114, and the wheel assemblies 112. A hole on the side of the rotor for adding MR fluid is closable by a screw 124.

A core assembly 126 is constructed with a core of magnetically soft steel, and includes an electric coil 128 and an external electric connector 130 in electrical communication. A hole provided for fluid fill is closable by a screw 132. The core assembly 126 is installed in the housing 104, and held in place by a clamp 134. Bearings 136 and 138 maintain positioning of the rotor 120 with the core assembly 126. A chamber 140, the available interior volume between seals 142 and 144, is filled with MR fluid. The core assembly 126 has a center passage to allow access to tighten the driver 108 on the end of the steering shaft 28 when the steering damper is installed. A plug 146, also preferably formed of magnetically soft steel, closes the center passage.

In operation, any rotation of the steering shaft is applied to the driver 108, which moves the wheel assemblies 112 in a circular path. The wheel assemblies in turn rotate because of their contact with the fixed housing 104. The rotating wheel assemblies 112 contact the rotor 120, and cause it to rotate about the core assembly 126. MR fluid in the chamber 140 causes damping of the rotation movement between the rotor 120 and the core assembly 126. When the coil 128 is energized, a magnetic field is set up approximately as shown by M. MR fluid in the gap between the core assembly 126 and the rotor 120 is affected by the field produced by the coil 128, and as the current to the coil is increased, the field increases and damping of the rotation of the rotor 120 is increased. This allows external control to be applied to the steering damper.

Figure 8:
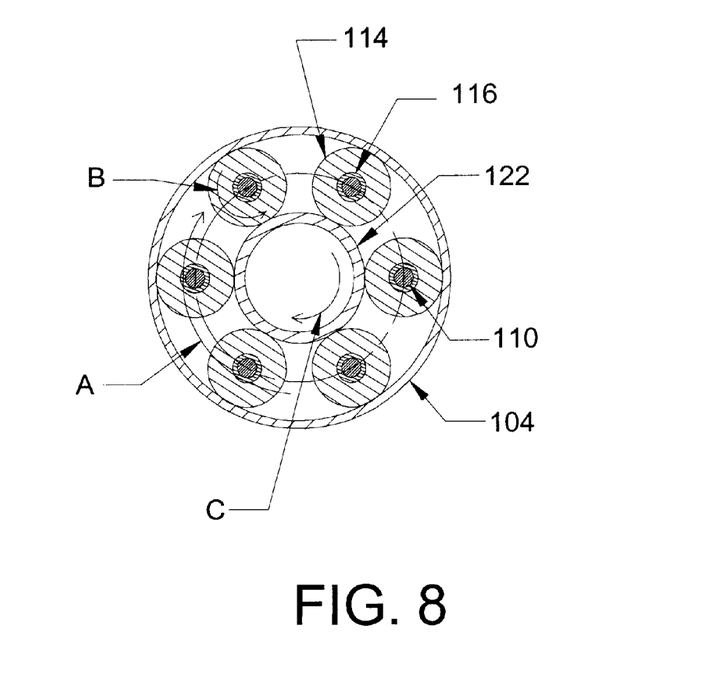
FIG. 8 is an axial cross sectional view of the alternative steering damper.

FIG. 8 shows the rotational relationships involving the stationary housing 104, the pins 110 on the driver 108, the wheel assembly wheels 114 and bearings 116, and the projections 122 on the rotor 120. When the steering wheel shaft rotates the driver 108 as shown by the arrow A, the wheel assemblies 112 are caused to rotate as shown by the arrow B. The wheel assemblies 112, which are also in contact with the rotor 120, cause the rotor to turn in the direction shown by the arrow C. The ratio of the speeds of the rotor 120 and the driver 108 can be found by dividing the diameter of the wheel contact surface of the housing 104 by the diameter of the wheel contact surface of the rotor 120, and adding one. The planetary configuration causes the rotor 120 to rotate faster than the driver 108, causing any torque developed by rotation of the rotor to be increased (corresponding to the ratio of speeds) as it is transmitted through the wheel assemblies 112 and the driver.

Gear lash is minimized by the metal-to-elastomeric contact, and because there is minimal lash between the wheel assemblies 112 and the pins 110. The elastomeric wheels 114 compress the flexible bearings 116 against the pins 110 of the driver to eliminate any looseness at that location. The presence of elastomeric members also allows for any small misalignment that may occur between the steering damper and parts of the steering gear during operation.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A damper for dampening vibrations of a rotatable steering shaft of a motor vehicle, the damper comprising:
   a rotor;
   means for rotating the rotor at a rare proportional to and greater than rotation of the steering shaft the means for rotating including a drive member rotatable with the steering shaft and a driven member rotatable with the rotor;
   a gear loading bracket retaining the drive member with the drive member; and
   a magnetorheological fluid disposed at least partially around the rotor, the magnetorheological fluid having a viscosity variable to vary a load on the rotor.

2. The damper of claim 1 wherein the drive member has a diameter greater than a diameter of the driven member.

3. The damper of claim 1 wherein the gear loading bracket includes a spring support.

4. The damper of claim 1 wherein the drive member includes a gear.

5. The damper of claim 1 wherein the driven member includes a gear.

6. The damper of claim 1 wherein the drive member includes a gear and the driven member includes a gear, and the drive member has more teeth than the driven member.

7. A damper for dampening vibrations of a steering shaft of a motor vehicle, the damper comprising:
   a drive member rotatable with the steering shalt, the drive member having a first diameter;
   a rotor having a driven member engaged with the drive member, the driven member having a second diameter less than the first diameter;
   a gear loading bracket retaining the driven member with the drive member; and
   a magnetorheological fluid disposed around the rotor, the magnetorheological fluid having a viscosity variable to vary a load on the rotor.

8. The damper of claim 7 wherein the gear loading bracket includes a spring support.

9. The damper of claim 7 wherein the drive member includes a gear.

10. The damper of claim 7 wherein the driven member includes a gear.

11. The damper of claim 7 wherein the drive member includes a gear and the driven member includes a gear, and the drive member has more teeth than the driven member.

* * * * *